March 10, 1970 T. N. HOOPER 3,499,797
WATER GAS SHIFT CONVERTER AND FUEL CELL SYSTEM THEREWITH
Filed April 28, 1966

INVENTOR
THOMAS N. HOOPER

E. Mickey Hubbard
ATTORNEY 3,499,797
WATER GAS SHIFT CONVERTER AND FUEL CELL
SYSTEM THEREWITH
Thomas N. Hooper, Decatur, Ala., assignor to Texas
Instruments Incorporated, Dallas, Tex., a corporation
of Delaware
Filed Apr. 28, 1966, Ser. No. 545,900
Int. Cl. H01m 27/14, 27/00; C01b 2/10
U.S. Cl. 136—86                                   13 Claims

ABSTRACT OF THE DISCLOSURE

A fuel cell system which provides and utilizes hydrogen as power by partial oxidation or reforming of a carbonaceous fuel and shift conversion of the partially oxidized or reformed product to yield hydrogen as fuel cell feed. A catalytic shift converter containing a number of tubes constructed of or coated with an oxidized chrome steel or ferrous oxide catalytic material for converting water gas to free hydrogen. The shift converter may be designed so as to allow heat exchange through the tube walls for temperature control.

---

This invention relates generally to fuel cell systems, and more particularly relates to a system for converting a mixture of carbon monoxide and water to carbon dioxide and hydrogen utilizing an improved shift converter.

In certain fuel cell systems, carbonaceous fuels containing hydrogen are consumed in order to produce electricity. In the process, the carbonaceous fuels are first converted to carbon monoxide and hydrogen, either by reforming or by partial oxidation. Then only the hydrogen gas is actually consumed in the fuel cell where it is combined with oxygen to form water and produce electricity. The amount of useful hydrogen may be increased by adding water to the mixture of carbon dioxide and hydrogen so that the oxygen from the water will combine with the carbon monoxide to produce carbon dioxide, thus freeing the hydrogen from the water in the shift reaction:

$$CO + H_2O \rightleftharpoons CO_2 + H_2 \qquad (1)$$

Reactors for the shift conversion of water gas to carbon dioxide and hydrogen are conventionally vessels packed with a catalyst supported by some inert material, or a catalyst in particulate form which lends itself to a packed bed formation. The use of packed beds presents several design and operational problems. In addition to having excessive pressure drops across the catalyst bed, the direction of flow is generally limited to either the vertical or horizontal direction to prevent channeling of the gas and thus bypassing of the bed. Also, the volume of the catalytic bed is often reduced by sintering of the catalyst, and by physical breakdown of the catalyst or supporting structure into fine particles. For these reasons, a conventional reactor used for the shift conversion of water gas cannot be used to advantage in most fuel cell systems. This is particularly true in the case of relatively small fuel cells utilizing a partial oxidizer such as the one described in copending U.S. patent application Ser. No. 540,577, entitled "Apparatus for Producing Hydrogen Gas by the Partial Oxidation of a Carbonaceous Fuel Containing Hydrogen," filed by West et al. on Apr. 6, 1966, wherein the process streams in the system are circulated by a jet pump deriving its energy from the vapor pressure of the liquid carbonaceous fuel. In such a system, pressure drops are a very significant factor.

In the water gas shift reaction (1) there is a thermodynamic equilibrium such that higher conversion rates are favored at lower temperatures. As mentioned, the shift conversion reaction normally follows a higher temperature reaction in a fuel cell system for producing hydrogen and carbon monoxide. For example, reforming of the basic fuel to produce hydrogen is carried out at 1200°–1600° F., while partial oxidation occurs at from about 2000° to about 2600° F. Thus, large quantities of heat must be removed from the gas stream to obtain lower equilibrium temperature and a better conversion rate. The equilibrium temperature can be controlled by operating a packed bed reactor at a high steam-to-gas ratio. But this requires the use of a disproportionately high volume of water to quench the gas stream to the desired lower temperature. In this way, the higher concentration of water drives the shift equilibrium in the direction of higher hydrogen production. However, the excess water must be subsequently removed, or a reduction in concentration of the desired constituents in the product gas stream will result.

An object of this invention is to provide a more efficient fuel cell system which utilizes a carbonaceous fuel.

Another object is to provide a more efficient system for producing hydrogen by the shift conversion of water gas.

A further important object of this invention is to provide an improved catalytic shift converter for producing free hydrogen from water gas which will result in a relatively low pressure drop in the resultant stream.

Another important object of the invention is to provide a shift converter wherein the equilibrium temperature is maintained at a temperature sufficiently low for efficient conversion rates by heat exchange with a cooler process stream, thus eliminating the addition of a disproportionately high volume of water, or other fluid to the process stream.

A further object is to provide a catalytic shift converter which is relatively inexpensive to fabricate and has a long and trouble free service lift.

In accordance with this invention, a system for efficiently producing hydrogen by the shift conversion of water gas with a minimum pressure drop is comprised of a plurality of smooth walled passageways the walls of which are coated with a suitable catalyst, and means for directing the water gas through the passageways. By forming the passageways with metal tubes, the shift reactor is highly resistant to erosion and has a long life.

In accordance with another aspect of the invention, the tubes are formed from a chrome steel so that when the surface is oxidized, the surface will act as a good catalyst.

In accordance with another important aspect of the invention, the walls of the tubular passageways are also used for heat exchange purposes so as to maintain the rection at the desired temperature. A fuel cell system is also provided wherein a carbonaceous fuel is oxidized to produce carbon monoxide which is mixed with water produced by a fuel cell and passed through the shift converter. The air for oxidizing the carbonaceous fuel is passed through the shift converter to cool the shift reaction and also preheat the air.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 2:
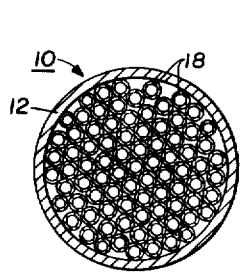
FIGURE 2 is a sectional view taken substantially on lines 2—2 of FIGURE 1.
Figure 1:
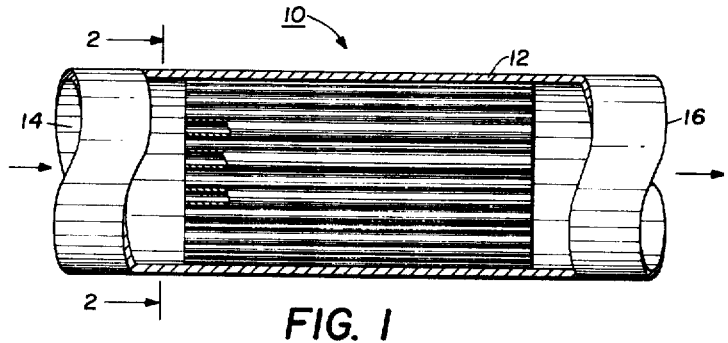
FIGURE 1 is a longitudinal view, partially broken away, of a water gas shift converter constructed in accordance with the present invention.

Referring now to the drawings, and in particular to FIGURE 1, a water gas shift converter constructed in accordance with the present invention is indicated generally by the reference numeral 10. The shift converter 10 is comprised of a generally cylindrical tube 12 which forms a vessel having an inlet 14 and an outlet 16. A large number of tubes 18 of much smaller diameter are located within the tube 12. The tubes 18 form a large number of smooth walled, substantially parallel, elongated passageways which are aligned longitudinally between the inlet 14 and the outlet 16, the passageways being formed both inside of the individual tubes, and in the spaces formed between adjacent tubes. The tube 12 functions to direct reactants through these passageways.

A substantial portion of the surfaces of the tubes, preferably both the internal and external surfaces, is coated with a suitable catalyst material, such as chrome promoted ferrous oxide, to promote the water gas shift conversion. Thus, by making the tubes 18 relatively small and preferably very thin walled, a relatively high catalytic surface area can be presented to the reactant stream while presenting a minimum interference with flow of the reactant stream through the shift converter. Yet the tubes can be fabricated from metal or other material of substantial strength so that erosion and disintegration of the tubes by the product stream is reduced to a minimum. By completely packing the tube 12 with the tubes 18, large channels through which disproportionate amounts of fluid will pass can be avoided.

In accordance with the broader aspects of the invention, the surfaces of the tubes may be coated with any suitable catalyst for promoting the shift reaction. In accordance with an important specific aspect of the invention, however, the tubes 18 are fabricated of chrome steel so that the surface will be or will become oxidized to form a chrome promoted ferrous oxide surface. These tubes resist excessive corrosion and have a very high strength so as to have a long life, even when very thin walled.

Although perhaps the simplest form of the invention is illustrated by the round tubes in FIGURE 1, it is to be understood that within the broader aspects of the invention, the smooth walled passageways extending longitudinally of the fluid flow can have substantially any cross-sectional configuration, such as triangular, square, rectangular, hexagonal, polygonal, etc. or may be formed by parallel plates, corrugated sheets, or the like, so long as the cross-sectional area of the passageways remain substantially constant and of substantially the same configuration so as to promote the smooth and orderly flow of the reactants through the converter. The passageways may be of substantially any length, within reason, necessary to achieve the ratio of catalyst surface to cross-section area necessary for efficient operation. Therefore, as used in this specification and claims, the term tubular includes any cross-sectional shape formed by one or more members.

Figure 3:
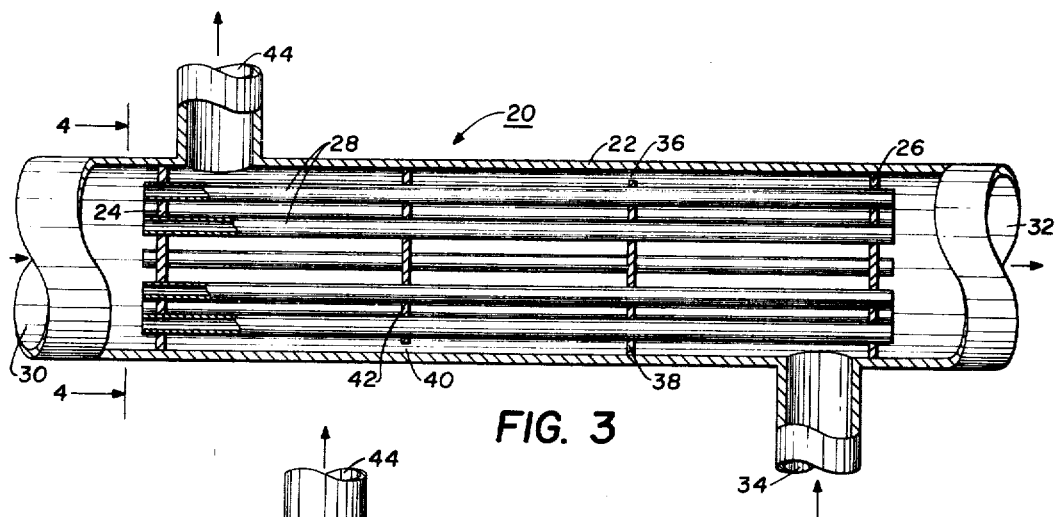
FIGURE 3 is a longitudinal view, partially broken away, of another water gas shift converter constructed in accordance with the present invention.
Figure 4:
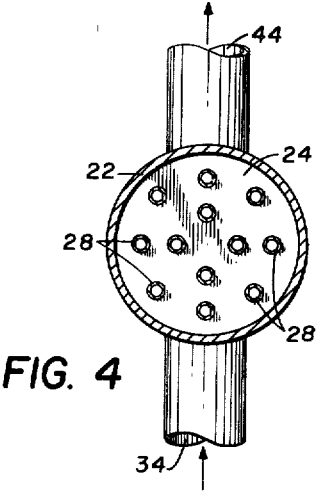
FIGURE 4 is a sectional view taken substantially on lines 4—4 of FIGURE 3.

Another shift converter constructed in accordance with the present invention is indicated generally by the reference numeral 20 in FIGURE 3. The shift converter 20 is comprised of a generally cylindrical vessel having a cylindrical wall 22 and end plates 24 and 26. A plurality of tubes 28 extend through the end wall 24, through the interior of the vessel, and through the end wall 26. The walls 24 and 26 are sealed around the periphery of each of the tubes 28, so that the interior of the tubes 28 is sealed from the interior of the vessel formed by the cylindrical wall 22 and end plates 24 and 26. A first gas stream is introduced through the inlet 30 and passes through the tubes 28 to an outlet 32. The tubes 28 thus collectively define one flow path. A second gas stream passes through an inlet 34 into the interior of the vessel, around the outside of the tubes 28 and through a space 36 between one edge of a baffle 38 and the wall 22, around the tubes 28 and through a space 40 between a baffle 42 and the wall of the vessel 22, and around the tubes 28 once again to an outlet 44. Thus the vessel defines a second flow path that is in heat exchange relationship with the first flow path through the tubes.

In operation, either the fluid stream passing the interior of the tubes 28, or the fluid stream passing around the tubes 28 is the water gas reactant stream, and the other stream is used to either heat or cool the reactant stream in order to maintain the desired equilibrium temperature and promote the conversion of the carbon monoxide and water to carbon dioxide and hydrogen. Thus, the surfaces of the tubes 28 that are in contact with the water gas stream are coated with a suitable catalyst as heretofore described. In particular, the tubes 28 may be a chrome steel, either solid or coated, so that when oxidized, either prior to use, or during use, the surfaces of the tubes will be a chrome promoted ferrous oxide. The number of tubes may be substantially greater than illustrated in the drawings for better efficiency.

Figure 5:
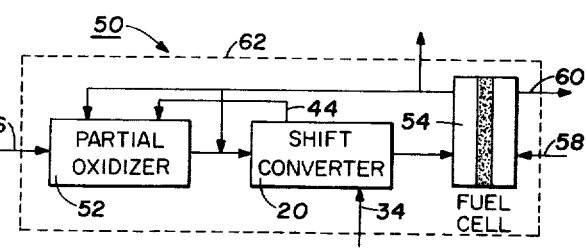
FIGURE 5 is a schematic flow diagram illustrating a fuel cell system in accordance with the present invention.

In accordance with another important aspect of the invention, the shift converter 20 is used in a fuel cell system indicated generally by the reference numeral 50 in FIGURE 5. The fuel cell system 50 includes a partial oxidizer 52, such as that described in the above referenced copending application. The product stream from the partial oxidizer includes hydrogen and carbon monoxide, together with some carbon dioxide, nitrogen and other constituents found in air, and some water from spent fuel recycled from a fuel cell 54 as will presently be described, and is at a relatively high temperature substantially above the optimum temperature for the shift reaction. The reactants are preferably passed through the tubes 28 of the shift converter 20. The products of the shift converter are fed to the fuel side of the fuel cell 54.

A portion of the spent fuel from the fuel cell 54 is recycled to the partial oxidizer 52 to prevent deposition of carbon in the system as the reactants are cooled, and a portion is recycled and mixed with the products of the partial oxidizer prior to introduction to the shift converter to supply the water necessary for the shift conversion reaction with the carbon monoxide from the partial oxidizer 52. The remainder of the spent fuel is vented to the atmosphere. Air from the atmosphere is passed through the inlet 34 around the tubes 28 and out the outlet 44 before being introduced to the partial oxidizer 52. A carbonaceous fuel is introduced through inlet 56 to the partial oxidizer. Ambient air is applied to the fuel cell through inlet 58 and is vented by outlet 60. The entire system 50 is located within a suitable insulated chamber, represented by dotted line 62, and the temperature within the chamber maintained at the operating temperature of the fuel cell.

A typical operating temperature of the fuel cell is about 650° C. The product gases from the partial oxidizer 52 are typically at about 1200° C. Thus, it is desirable to reduce the temperature of the product stream from the partial oxidizer 52 prior to its introduction to the fuel cell 54. It is also highly desirable to carry on the shift reaction in the shift converter 20 at a temperature substantially less than the 1200° C. Also, the shift reaction is exothermic and this heat must be removed in order to maintain the desired temperature in the shift converter 20. At the same time, the efficiency of the partial oxidizer 52 is increased by preheating the air from the ambient that is used to oxidize the fuel. Thus the ambient air directed through the shift converter maintains a low equilibrium temperature for optimum efficiency of the shift converter 20 and also precools the product stream from the partial oxidizer and shift converter prior to intoduction to the fuel cell 54. At the same time, the ambient air is preheated prior to introduction to the partial oxidizer, thus increasing the efficiency of the partial oxidizer. Yet the pressure drop through the shift converter 20 is maintained at a minimum and the shift converter 20 is relatively inexpensive and has a long useful life. It is also to be understood that within the broader aspects of the invention, the tubes 28 or other passageways for the two fluid streams which exchange heat, may be of substantially any configuration when the pressure drop through the shift converter is no consideration. In the latter case, the carbon monoxide and water may be passed through either of the flow paths. Although the ambient air is advantageously used to cool the shift converter, any other process stream within the fuel cell system may also be used if at a suitable temperature.

Although a preferred embodiment of the invention has been described in detail, it is to be understood that various changes, substitutions and alterations can be made therein without departing from the spirit and scope of the invention as defined by the appended claims.

What is claimed is:

1. In a system for producing hydrogen from a carbonaceous fuel, the combination of means for producing carbon monoxide from a carbonaceous fuel, means for adding water to the carbon monoxide, a plurality of smooth walled, generally parallel passageways formed by an oxidized chrome steel shift reaction catalyst, and means for directing the water and carbon monoxide through the passageways whereby the catalyst will promote the conversion of the water and carbon monoxide to carbon dioxide and hydrogen by a shift reaction.

2. The combination defined in claim 1 further characterized by means for passing a cooling fluid in heat exchange relationship to the carbon monoxide and water passing through the passageways without comingling the cooling fluid with the carbon monoxide and water.

3. The combination defined in claim 1 wherein the passageways are formed by a plurality of chrome steel tubular members, the surfaces of which are ferrous oxide for use as the catalyst.

4. The combination defined in claim 1 wherein the passageways are formed by a bundle of tubular members disposed in side abutting, parallel relationship and extending longitudinally within, and completely filling, a tubular housing.

5. The combination set forth in claim 4 wherein the tubular members are comprised of chrome steel.

6. In a system for producing hydrogen from a carbonaceous fuel, the combination of means for producing carbon monoxide from a carbonaceous fuel, means for adding water to the carbon monoxide, heat exchanger means comprised of walls forming first and second separate fluid passageways in heat exchange relationship, the walls forming the first passageway being formed of oxidizable chrome steel for promoting the shift conversion of carbon monoxide and water to carbon dioxide and hydrogen, means for directing the carbon monoxide and water through the first passageway, and means for directing a cooling fluid through the second passageway.

7. In a fuel cell system for converting a carbonaceous fuel to electrical energy, the combination of a fuel cell for producing electrical energy from the chemical combination of hydrogen and oxygen to form water, means for producing a carbon monoxide stream from a carbonaceous fuel, means for adding a portion of the water produced by the fuel cell to the carbon monoxide stream, a plurality of smooth walled, generally parallel passageways formed by a ferrous oxide shift reaction catalyst, and means for directing the water and carbon monoxide stream through the passageways and to the fuel cell whereby a relatively small pressure drop will occur as the gases pass through the passageways and the shift conversion of the carbon monoxide and water to carbon dioxide and free hydrogen will be promoted by the catalyst and the free hydrogen used by the fuel cell to produce electrical energy.

8. The combination defined in claim 7 further characterized by means for passing a cooling fluid in heat exchange relationship with the carbon monoxide and water passing through the passageways without comingling the cooling fluid and the carbon dioxide and water.

9. The combination defined in claim 8 wherein the means for producing carbon monoxide is a partial oxidizer using ambient air as the oxidizer, and the means for passing a cooling fluid in heat exchange relationship with the carbon monoxide and water comprises utilizing the ambient air as the cooling fluid and includes means for directing the warmed air to the partial oxidizer.

10. A shift conversion reactor for catalytically producing carbon dioxide and hydrogen from carbon monoxide and water comprising a plurality of smooth walled substantially parallel passageways formed by oxidized chrome steel and means for directing a stream of carbon monoxide and water through the passageways whereby the catalyst will promote the shift conversion of the carbon monoxide and water to carbon dioxide and hydrogen.

11. A shift conversion reactor comprising a plurality of chrome steel tubes, the surfaces of which are oxidized to chrome promoted ferrous oxide and means for directing a stream of carbon monoxide and water through the tubes.

12. The shift conversion reactor defined in claim 11 wherein the tubes are disposed in side abutting relationship and form passageways between the tubes as well as within the tubes.

13. The shift conversion reactor defined in claim 11 further characterized by means for passing a cooling fluid around the tubes without comingling the cooling fluid with the carbon monoxide and water passing through the tubes.

References Cited

UNITED STATES PATENTS

| 2,387,454 | 10/1945 | Marisic _____ 252—477 X |
| 2,968,636 | 1/1961 | Sciallano et al. _____ 252—470 |
| 2,018,619 | 10/1935 | Winckler et al. _____ 23—288.92 |
| 2,206,685 | 7/1940 | Balachowsky _____ 23—288.92 |
| 2,526,657 | 10/1950 | Guyer _____ 23—288.92 |
| 2,631,086 | 3/1953 | Moak et al. _____ 23—213 |
| 3,150,931 | 9/1964 | Frank _____ 23—213 |
| 3,179,500 | 4/1965 | Bowen et al. |
| 3,251,652 | 5/1966 | Pfefferle _____ 23—213 |
| 3,351,492 | 11/1967 | Heyes et al. |
| 3,357,916 | 12/1967 | Smith _____ 23—288.92 X |

A. B. CURTIS, Primary Examiner

U.S. Cl. X.R.

23—213, 288; 252—470, 477